UNITED STATES PATENT OFFICE.

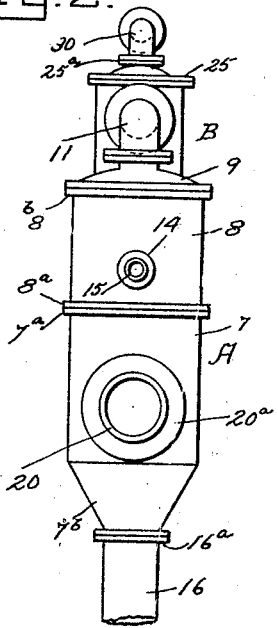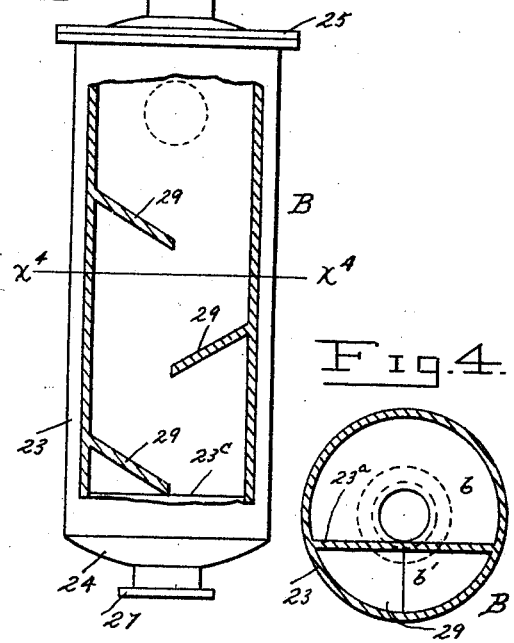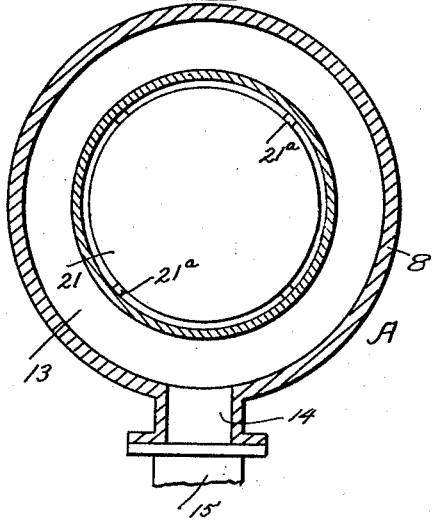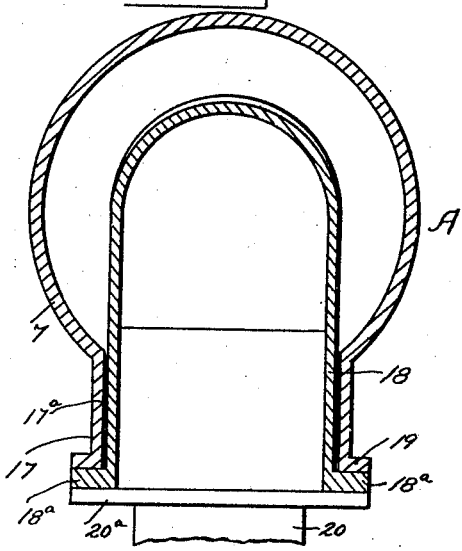

ERNST E. HORSTMANN, OF LOS ANGELES, CALIFORNIA.

CONDENSER.

1,367,743.

Specification of Letters Patent.  Patented Feb. 8, 1921.

Application filed August 11, 1917. Serial No. 185,670.

*To all whom it may concern:*

Be it known that I, ERNST E. HORSTMANN, a subject of the Emperor of Germany, residing at Los Angeles, in the county of Los Angeles and State of California, have invented new and useful Improvements in Condensers, of which the following is a specification.

This invention relates to condensers, and more particularly to jet condensers, and the invention has for its object to provide a highly efficient condenser which may be used with steam apparatus of many types and forms, which will operate with a relatively small vacuum pump and which will maintain a high average vacuum in steam apparatus throughout a wide range of working conditions. Condensers of this general type as ordinarily constructed, are not efficient at both maximum and minimum steam supply for the same unit, usually a large condenser being uneconomical and inefficient in operation when handling volumes of steam considerably below the normal supply.

In accordance with the invention a jet condenser is provided in which the entering steam is preferably first caused to impinge upon a baffle to rid the same of water and such steam or the air therein is then caused to successively traverse or pass through a series of cataracts of condensing water preferably supplied at a point above the point of steam admission, suitable cataract-forming members being arranged within the condenser body proper and over which the condensing water must flow in its travel to the well in condensing action. At the top of the main chamber of the condenser to which the condensing water and steam are first admitted, an orifice is provided and a conduit leads from such orifice to a second chamber or trap in which further condensing or water extraction may take place, a series of baffles being arranged in such second chamber to prevent the invasion by any water of the pipe line leading to the vacuum pump. The pump preferably employed with this apparatus is of the "dry vacuum" type, as in a condenser organized in accordance with the invention the air liberated from the steam and condensing water is dried as thoroughly as possible before reaching the pump and the second chamber or trap is devised to extract as much of the moisture or water vapor suspended in the air as possible, the vacuum pump being connected with an orifice in the top wall of such second chamber or trap. A further orifice is provided in the lower wall of the second chamber or trap and the same is connected by means of a pipe to the well of the condenser to which the drain pipe leading from the bottom of the main condenser chamber likewise leads. All of the passageways in the condenser chamber proper and the trap as well as the passageway between the same are of a relatively large area as compared to the orifice leading from the trap to the vacuum pump or the pipe line leading to such pump, such proportioning of parts and members providing for a relatively sluggish travel of steam and vapor-laden air through the condenser proper and the trap as compared with the more rapid movement of the air through the pipe leading to the pump. Likewise, the greater baffling and cooling surfaces provided by said proportioning rids the non-condensible air which is removed by the pump, of as much of the suspended water vapor therein as possible, as well as permitting the use of a much smaller vacuum pump for a condenser of given capacity, than has hitherto been possible. As the degree of vacuum maintained in the condenser, and the consequent efficiency of the apparatus with which the condenser is connected, is dependent upon the amount of vapor suspended in the air and the amount of air in the condenser, the further ridding of the air on its way to the pump of vapor as it passes through the trap, makes for very high efficiency. The condenser shown in the drawings is a type in which a material difference between the temperature of steam exhausted into the condenser and the temperature of the air and vapor discharged is great, and consequently only a small volume of air and vapor must be removed by the pump. The condensing water entering above the point of steam entry is coldest where the air last passes through the same and hottest at the point of first contact with the steam, thus insuring the removal of the air by the vacuum pump in the coolest possible condition.

A further object of the invention is to provide a condenser of the general character stated which will be relatively simple and inexpensive in construction and organization when its high efficiency and adaptability to a wide range of service conditions are considered, and which will be generally superior in serviceability.

With the above and other objects in view, the invention consists in the novel and useful provision, formation, combination, association and relative arrangement of parts, members and features, all as hereinafter described, shown in the drawings, and finally pointed out in claims.

In the drawings:

Fig. 2 is a fragmentary elevation of the showing in Fig. 1, and looking in the direction of the large arrow near Fig. 1;

Fig. 3 is an enlarged detail sectional view, taken on the line $x^3$—$x^3$, Fig. 1, and looking in the direction of the appended arrows;

Fig. 4 is an enlarged horizontal sectional view taken on the line $x^4$—$x^4$, Fig. 1;

Fig. 5 is an enlarged horizontal sectional view taken on the line $x^5$—$x^5$, Fig. 1; and Fig. 6 is a horizontal sectional view taken on the line $x^6$—$x^6$, Fig. 1.

Corresponding parts in all the figures are designated by the same reference characters.

Figure 1:
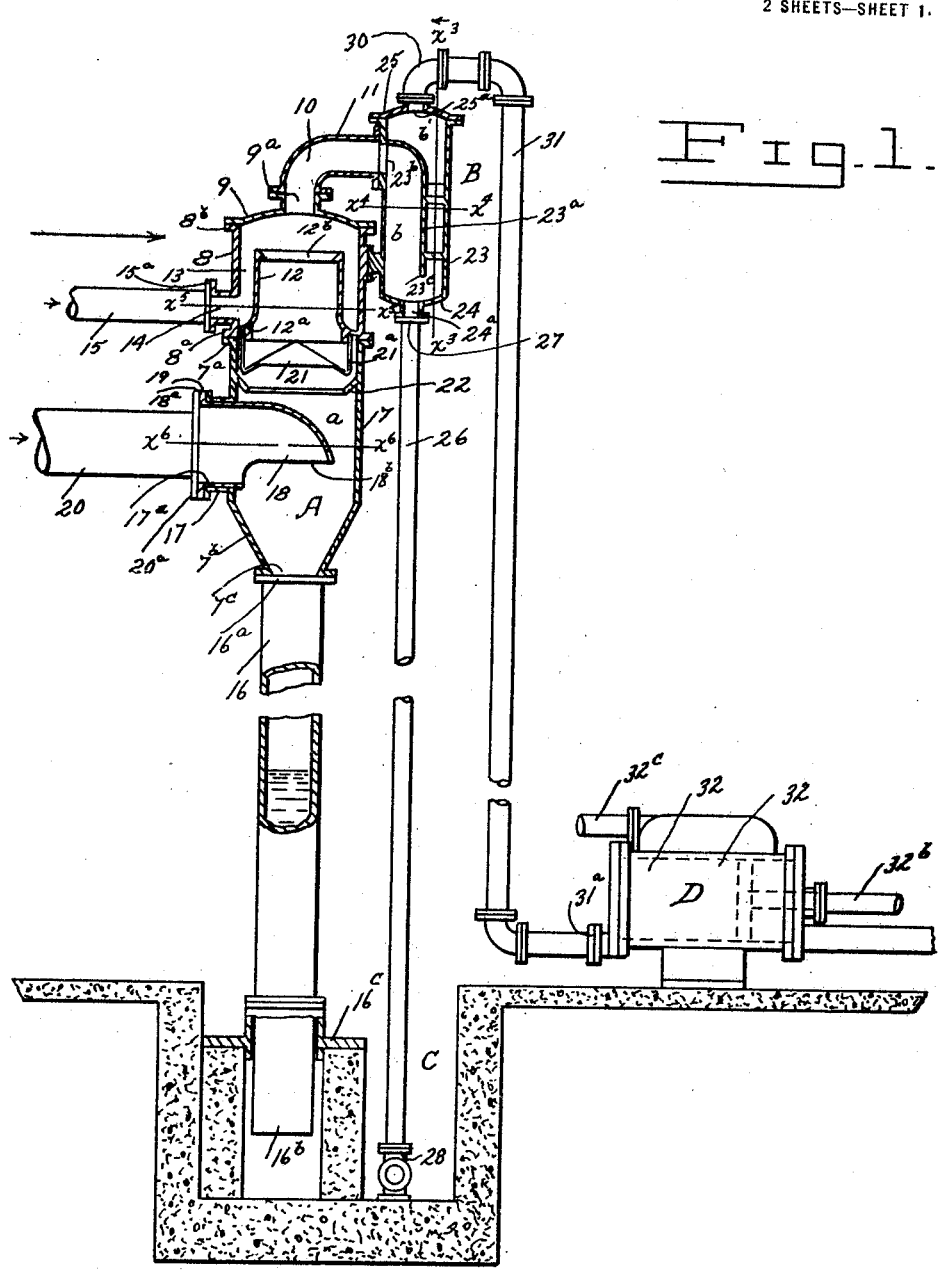
Figure 1 is a fragmentary sectional view, parts being shown in elevation, of a condenser constructed and organized in accordance with the invention.

Referring with particularity to the drawings, in the embodiment of the invention therein shown A designates a main condenser chamber, B designates a secondary chamber or trap, C designates a well, and D designates vacuum producing means.

The main condenser chamber A is formed in a casing $a$, which casing is shown as comprising a lower tubular member 7, an upper tubular member 8, and a closure member 9. The members 7 and 8 are preferably joined together by means of flanges $7^a$ and $8^a$ and the closure 9 is applied to a flange $8^b$ at the upper portion of the member 8, an outlet orifice $9^a$ being provided in the closure 9 and through which orifice a passageway 10 formed in a pipe elbow 11 communicates with the interior of the chamber A. In the upper tubular member 8 a cylindrical member 12 is positioned preferably concentrically with the tubular member 8 and such member 12 is joined by a lateral flange $12^a$ at its bottom portion to the lowermost portion of the interior wall of the member 8, thus forming an annular water space 13 between the tubular member 8 and the cylindrical member 12. The cylindrical member 12 has its upper end formed with an inwardly directed flange $12^b$ the upper surface of which flange $12^b$ is downwardly and inwardly inclined to provide for the proper discharge of a circular sheet of water into the space provided internally of the cylindrical member 12 as such water overflows from the space 13. Just above the point of junction of the lateral flange $12^a$ with the inner surface of the member 8 a water inlet orifice 14 is provided in the wall of the member 8, and a water inlet pipe 15 is connected with the member 8 at such orifice as at $15^a$. The tubular member 7 which is joined to the lower end of the member 8 is preferably of equal diameter therewith at its upper end, but is gradually reduced in diameter at its lower end as at $7^b$ producing a conical formation, an outlet orifice $7^c$ being provided at the extreme end of the conical formation where a discharge pipe 16 is connected to the member 7 as at $16^a$ by means of suitable flanges. A hollow laterally projecting boss 17 is provided on the member 7 between its ends, and such boss is bored as at $17^a$ to receive a baffle member 18, which baffle member is the terminus of the steam admission pipe. The baffle member 18 preferably consists of a short length or elbow of pipe flanged at its outer end as at $18^a$ to provide means whereby the same can be secured to a flange 19 provided on the hollow boss 17. The elbow 18 is cut away at its downwardly directed discharge end to produce preferably the formation shown in Fig. 1 as at $18^b$ and at the flange $18^a$ such elbow has applied thereto a flange $20^a$ of the steam exhaust pipe 20. All of the joints as between the members 7, 8, 9, and between such members and the respective pipes secured thereto may be made as by passing bolts through suitable orifices in the respective flanges. In the upper zone in the member 7 a conical member 21 is positioned by means of a plurality of arms or rods $21^a$ whereby the cone may be suspended from the member 8 and immediately beneath and concentrically with the cylindrical member 12. In a further zone immediately below the conical member 21 a conical inwardly directed annular flange 22 springs from the wall of the member 7, such annular inwardly directed flange being so interposed between the cone and the elbow 18. The discharge pipe 16 enters the well C which may be formed according to standard practice, as will be well understood by those skilled in the art, where such pipe terminates as at $16^b$ at a slight distance above the bottom of the well C, the pipe being secured in a suitable support $16^c$ provided in the well.

The secondary chamber or trap B preferably comprises a cylindrical shell 23 having a bottom closure 24 and a top closure 25. In the interior of the shell 23 a partition $23^a$ is formed and such partition divides the shell into two longitudinally ranging divisions or passages $b$ and $b'$ the partition $23^a$ being curved to meet the wall of the shell just above an orifice $23^b$ provided in the shell and ranging downwardly therefrom to a point near the closure 24 as at $23^c$, thus providing a downwardly directed passage for the vapor-laden air to be drawn from the condenser by the pump. The bottom closure 24 has a discharge port 24ª provided therein and a drain pipe 26 is connected to such closure as at 27 and in registration with the aperture 24ª. The lower end of the drain pipe is positioned in the well C as at 28. In the longitudinal passage $b'$ baffles 29 are provided, such baffles 29 extending preferably alternately, one from one side of the passage and the next succeeding baffle from the other side of the passage to provide a tortuous passageway for the vapor-laden air on its way to the pump, the under surfaces of the baffles 29 serving to catch water in the air and the upper surfaces of the baffles serving as guides to return water caught by higher baffles and discharged therein toward the drain pipe 26. The upper closure 25 of the trap B is apertured as at 25ª, the elbow 30 of a pipe 31 being connected with the closure 25 at the orifice 25ª and in registration therewith. At its end opposite the connection with trap B the pipe 31 is connected to a vacuum pump 32 comprising the means D, as at 31ª. The pipe 31 is relatively small, that is, its internal diameter and consequently the cross-sectional area of the passageway therein is much smaller than the cross-sectional area of any part of the condenser proper, the pipe 11, or the passageways $b$ and $b'$ in the trap B. The pipe 11 is connected with the shell 23 at the orifice 23ª therein.

The vacuum producing means D is conventionally shown as a pump of the "high vacuum" type and such pump may be of any preferred form, the improved condenser permitting the use of a small pump with a relatively large condenser. The cylinder of the pump 32 is shown at 32ª, the piston rod at 32ᵇ, and the discharge pipe at 32ᶜ. It will be understood that the pump may be actuated by any prime mover or other source of energy or power.

The operation, method of use and advantages of the improved condenser will be readily understood from the foregoing description, taken in connection with the accompanying drawings and the following statement:

The condenser being connected with the exhaust of steam apparatus, such as a steam engine, evaporating pans, or any other apparatus with which it is desirable to use a condenser, as by connecting such apparatus with the pipe 20, the steam from the steam apparatus will be exhausted into the condenser through the elbow 18, and will be condensed therein as will presently be described. The pipe 15 is connected with any suitable source of supply of cold condensing water, which condensing water enters the chamber A through the orifice 14 and filling the annular space 13 between the cylindrical member 12 and the wall of the member 8, overflowing into the member 12 over the inclined upper edge 12ᵇ thereof and forming a cataract or circular sheet of falling water which impinges on the upper surface of the cone 21, which surface is suitably angled to again discharge the water in a further circular sheet and over the edge of the cone, thus forming a second cataract, which second cataract terminates at the annular inclined ledge 22 formed in the member 7, which ledge 22 is suitably angled with respect to the inclination of the surface of the cone to properly receive the second cataract and discharge the same through the central orifice 22ª formed by the ledge 22, the angular relation of the inclination at 12ᵇ and the inclination of the cone surface, and the angular relation of the ledge 22 and the cone surface is preferably so proportioned that even with very little water flowing over the inclination 12ᵇ the cone will not be missed by such water and the water discharged by such cone cannot miss the ledge 22 from which it is discharged, against the elbow 18 and from which elbow it is discharged as a further cataract. The water finally passes out through the discharge tube 16 into the well C. Upon movement of the piston of the pump 32, the entrapped or impounded air in the condenser will be withdrawn therefrom and the air contained in the entering steam and the condensing water will be put under a tension and withdrawn by the pump, producing a partial vacuum in the condenser, the water in well C rising in the pipe 16 and in the drain pipe 26 to a height corresponding to the degree of vacuum maintained, and the steam entering the pipe 20 will impinge on the water flowing through the condenser chamber A and be thereby condensed, the water of condensation passing out through the pipe 16 with the condensing water. Air contained in the steam or in the condenser will be drawn out by the vacuum pump through the pipe 11, through the passageway $b$ in the trap, around the lower end of the partition 23ª, through the tortuous passageway $b'$, and through the relatively small pipe 31 to the pump where the same is exhausted. During its travel to the pump such air will have to pass through the succeeding cataracts of condensing water encountered as it rises through the chamber A, counter to the direction of water flow, and such air will be reduced in temperature and give up much of its vapor, after which it is drawn through the pipe 11 into the trap B where upon striking and rounding the partition 23ª still further vapor is condensed and deposited upon the partition 23ª after which in successively impinging upon the baffles interposed in its path in the passageway $b'$ further water will be extracted therefrom by such baffles and the internal surfaces of the passageway, after which the relatively dry air is inducted into the pump 32 through the pipe 31. As the pipe 31 is of small internal area as compared to the other passageways in the condensing apparatus, the movement of the air or other elastic medium being withdrawn from the condenser by the pump will be relatively sluggish in the condenser chamber B and the trap B, due to the small pipe 31 where such air or other elastic medium is speeded up by the pump as it is withdrawn, this sluggish movement or relatively long dwelling in the condenser chamber A and the trap B insuring the precipitation or deposition on surfaces of most of the water vapor which would otherwise find its way to the dry vacuum pump and consequently interfere with the efficiency of the pump as well as the economy of the condensing system, as hereinabove pointed out.

Having thus disclosed my invention, I claim and desire to secure by Letters Patent:

1. In a condenser, the combination with a main condensing chamber, of a U-shaped trap having a cross sectional area less than that of the main condensing chamber, a pipe leading from the main condensing chamber to one arm of the trap and having a cross sectional area less than that of the trap, a suction pipe leading to the other arm of the trap and having a cross sectional area considerably less than that of the first mentioned pipe, a drain leading from the trap, and baffles in the trap.

2. In a condenser, the combination with a main condensing chamber, a vertically disposed U-shaped trap arranged at one side of the condensing chamber and having a smaller cross sectional area than the main condensing chamber, a pipe leading from the top of the main condensing chamber to one arm of the trap and having a cross sectional area less than that of the trap, a suction pipe leading from the opposite arm of the trap and having a cross sectional area considerably less than that of the first mentioned pipe, a series of staggered baffles arranged in the second mentioned arm of the trap and inclined downwardly in opposite directions from the sides thereof to provide a tortuous passage and facilitate the accumulation of condensed fluid at the bottom of the trap, and a drain pipe leading from the bottom of the trap.

3. In a condenser, the combination with a main condensing chamber, of a U shaped trap of which one arm has a cross sectional area less than the other arm, a pipe leading from the main condensing chamber to that arm of the trap having the larger cross sectional area, said pipe having a cross sectional area less than that of either arm of the trap, a suction pipe leading from tne trap arm having the smaller cross section and having a cross section considerably less than that of the first mentioned pipe, a series of staggered baffles arranged in the arm of the trap having the smaller cross section, and a drain pipe leading from the bottom of the trap.

In testimony whereof, I have signed my name to this specification in the presence of two subscribing witnesses.

ERNST E. HORSTMANN.

Witnesses:
  RAYMOND IVES BLAKESLEE,
  EDNA TURNER.